US012036551B2

(12) United States Patent
Wang et al.

(10) Patent No.: US 12,036,551 B2
(45) Date of Patent: Jul. 16, 2024

(54) MICROFLUIDIC DEVICE

(71) Applicant: NATIONAL CHUNG CHENG UNIVERSITY, Chiayi (TW)

(72) Inventors: Shau-Chun Wang, Chia-Yi (TW); Lai-Kwan Chau, Chiayi (TW); Yuan-Yu Chen, Nantou County (TW)

(73) Assignee: NATIONAL CHUNG CHENG UNIVERSITY, Chiayi (TW)

( * ) Notice: Subject to any disclaimer, the term of this patent is extended or adjusted under 35 U.S.C. 154(b) by 227 days.

(21) Appl. No.: 17/358,021

(22) Filed: Jun. 25, 2021

(65) Prior Publication Data

US 2022/0339626 A1 Oct. 27, 2022

(30) Foreign Application Priority Data

Apr. 23, 2021 (TW) ................................ 110114816

(51) Int. Cl.
*B01L 3/00* (2006.01)

(52) U.S. Cl.
CPC ..... *B01L 3/50273* (2013.01); *B01L 3/502715* (2013.01); *B01L 2300/12* (2013.01); *B01L 2300/126* (2013.01); *B01L 2300/165* (2013.01); *B01L 2400/0427* (2013.01)

(58) Field of Classification Search
CPC ......... B01L 2300/0645; B01L 2300/12; B01L 2300/126; B01L 2300/165; B01L 2400/0406; B01L 2400/0427; B01L 3/502715; B01L 3/50273; B01L 3/502792
See application file for complete search history.

(56) References Cited

U.S. PATENT DOCUMENTS

2011/0186433 A1* 8/2011 Pollack ............. B01L 3/502761 204/549
2022/0219172 A1* 7/2022 Soto-Moreno .......... B01L 7/525

OTHER PUBLICATIONS

Soum et al, "Affordable Fabrication of Conductive Electrodes and Dielectric Films for a Paper-Based Digital Microfluidic Chip", Feb. 7, 2019, Micromachines 2019, 10, 109 (pp. 1-10) (Year: 2019).*
Jain et al, "Effect of electrode geometry on droplet velocity in open EWOD based device for digital microfluidics applications" Journal of Electrostatics 87 (Mar. 2, 2017) pp. 11-18. (Year: 2017).*

* cited by examiner

*Primary Examiner* — Dennis White
(74) *Attorney, Agent, or Firm* — CKC & Partners Co., LLC

(57) ABSTRACT

The present disclosure provides a microfluidic device, including a bottom substrate, an electrowetting-on-dielectric (EWOD) chip, a circuit board, a dielectric film, and a motor. The EWOD chip is disposed on the bottom substrate, and the circuit board is arranged on the EWOD chip. The circuit board includes a circuit area that is electrically connected to the EWOD chip, and the empty area is adjacent to the circuit area and the EWOD chip is exposed. The dielectric film is disposed on the empty area of the circuit board and covers the exposed EWOD chip. The motor is disposed under the bottom substrate, and one end of the motor has a magnetic structure, so that the magnetic structure can move closer to or away from the bottom substrate.

13 Claims, 9 Drawing Sheets

100

MICROFLUIDIC DEVICE

CROSS-REFERENCE TO RELATED APPLICATION

This application claims priority to Taiwan Application Serial Number 110114816, filed on Apr. 23, 2021, which is herein incorporated by reference in its entirety.

BACKGROUND

Field of Invention

The present invention relates to a microfluidic device.

Description of Related Art

In order to make a small integrated system with multiple functional components, the development of Micro-Electro-Mechanical Systems (MEMS) and even Nano-Electro-Mechanical Systems (NEMS) technology is also used in biomedical detection. The concept of Micro-Total Analysis Systems (μ-TAS) and the lab-on-a-chip (LOC) challenge the existing large-scale detection systems, and various functional systems including sampling, mixing, reaction, detection, etc. are integrated on the same chip.

However, the cost of current wafer development is expensive, which is not easy for commercialization. Therefore, how to develop a low-cost disposable chips, the disadvantage of the prior art should be resolved.

SUMMARY

The invention provides a microfluidic device, comprising a bottom substrate, an electrowetting-on-dielectric (EWOD) chip, a circuit board, a dielectric film, and a motor. The EWOD chip is disposed on the bottom substrate. The circuit board is disposed on the EWOD chip, and the circuit board comprises a circuit area electrically connected to the EWOD chip; and a hollow area is adjacent to the circuit area, and the EWOD chip is exposed. The dielectric film is disposed on the hollow area of the circuit board, and covering the exposed EWOD chip. The motor is disposed beneath the bottom substrate, with an end of the motor having a magnetic structure, so that the magnetic structure can move closer to or away from the bottom substrate.

In one embodiment, the EWOD chip comprises a paper-based chip.

In one embodiment, the EWOD chip comprises a chip substrate; and a conductive layer having a plurality of electrode wires is disposed on the chip substrate.

In one embodiment, an end of each of the electrode wires is an electrode unit.

In one embodiment, a pattern of each of the electrode units is an interdigitated pattern.

In one embodiment, a material of each of the electrode wires comprises nano silver.

In one embodiment, a material of the dielectric film comprises polytetrafluoroethylene, paraffin film, or a combination thereof.

In one embodiment, the circuit area surrounds the hollow area.

In one embodiment, the circuit area surrounds the hollow area, a portion of the circuit area adjacent to the hollow area has a plurality of pins, and the pins are electrically connected to the conductive layer of the EWOD chip.

In one embodiment, the microfluidic device further comprises a plurality of magnets, some of the magnets located on the pins, and the others of the magnets correspondingly located beneath the EWOD chip and magnetically attracted to some of the magnets located on the pins, so that the pins are closely attached to the conductive layer.

In one embodiment, the microfluidic device further comprises a hydrophobic layer disposed on the dielectric film.

In one embodiment, a material of the hydrophobic layer comprises silicone oil.

In one embodiment, the bottom substrate has a hole located corresponding to the hollow area.

In one embodiment, the microfluidic device further comprises a support sheet disposed between the EWOD chip and the bottom substrate.

In one embodiment, the motor is a servo motor.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides detailed description of many different embodiments, or examples, for implementing different features of the provided subject matter. These are, of course, merely examples and are not intended to limit the invention but to illustrate it. In addition, various embodiments disclosed below may combine or substitute one embodiment with another, and may have additional embodiments in addition to those described below in a beneficial way without further description or explanation. In the following description, many specific details are set forth to provide a more thorough understanding of the present disclosure. It will be apparent, however, to those skilled in the art, that the present disclosure may be practiced without these specific details.

Further, spatially relative terms, such as "beneath," "over" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising”, or “includes” and/or “including” or “has” and/or “having” when used in this specification, specify the presence of stated features, regions, integers, steps, operations, elements, and/or components, but do not preclude the presence or addition of one or more other features, regions, integers, steps, operations, elements, components, and/or groups thereof.

A number of examples are provided herein to elaborate the microfluidic device of the instant disclosure. However, the examples are for demonstration purpose alone, and the instant disclosure is not limited thereto.

Figure 1:
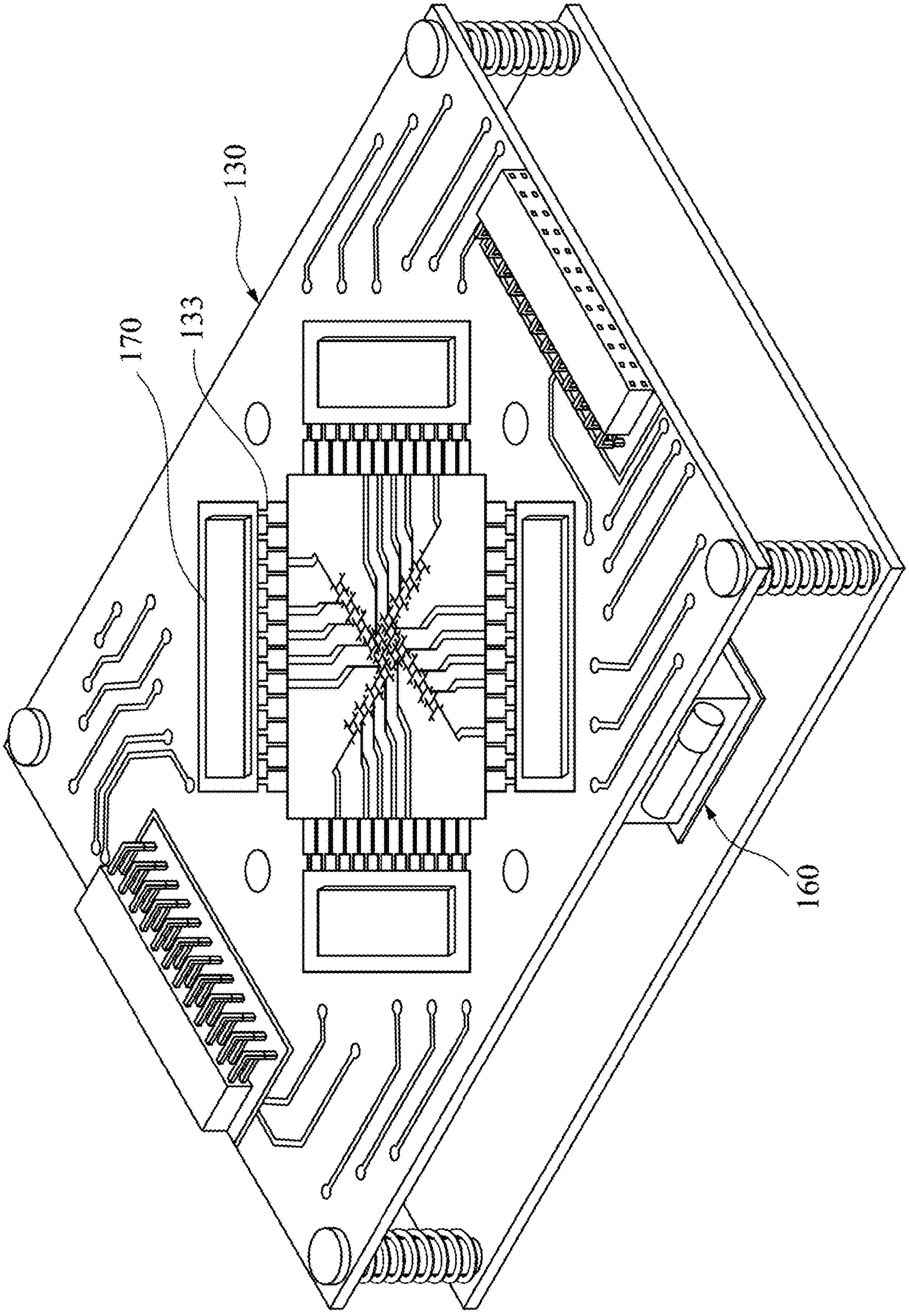
FIG. 1 is a perspective view of a microfluidic device according to some embodiments of the present disclosure.
Figure 2:
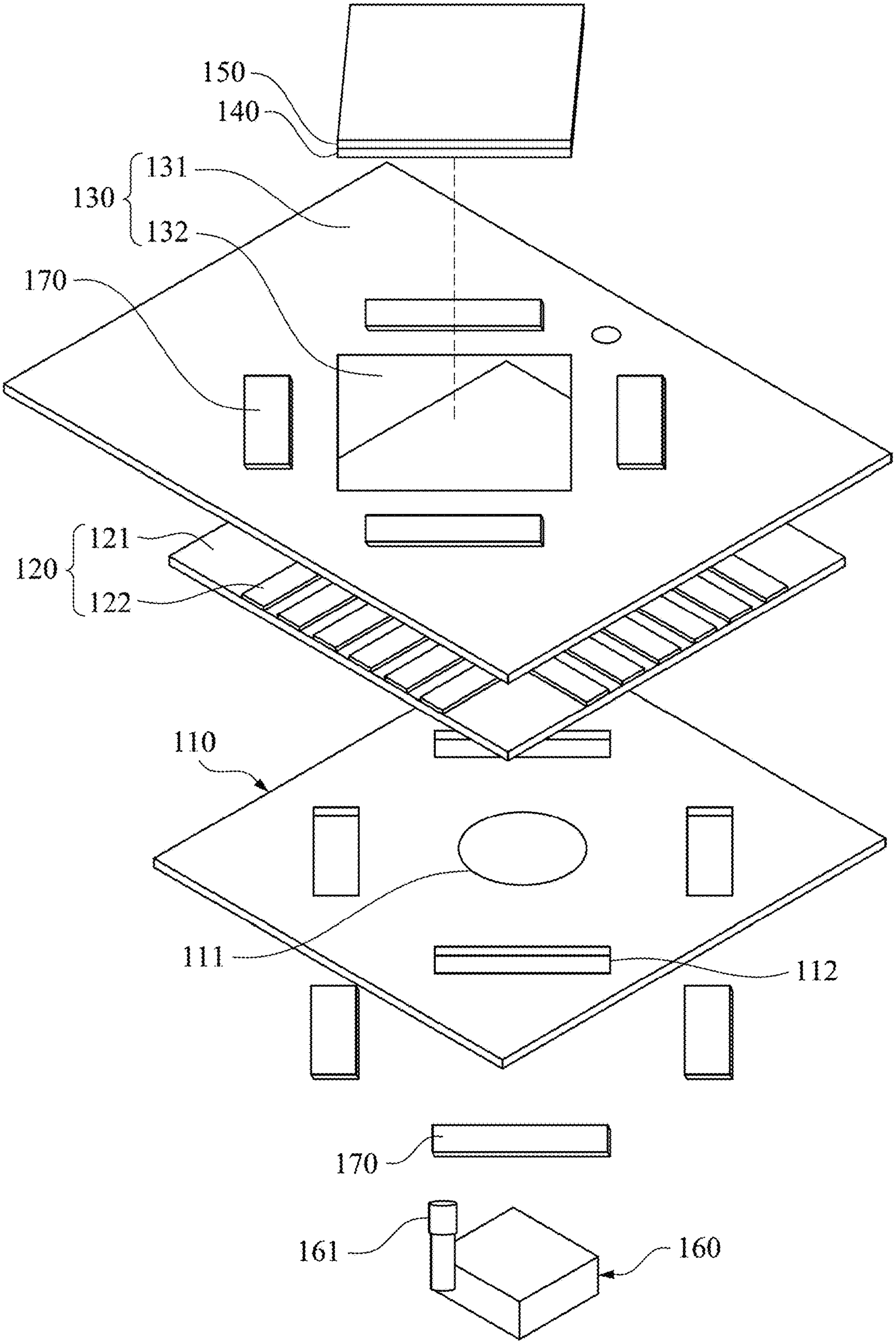
FIG. 2 is an exploded view of the microfluidic device according to some embodiments of the present disclosure.

Please refer to FIG. 1 and FIG. 2, FIG. 1 is a perspective view of a microfluidic device according to some embodiments of the present disclosure, and FIG. 2 is an exploded view of the microfluidic device according to some embodiments of the present disclosure. One embodiment of the present disclosure provides a microfluidic device 100, including a bottom substrate 110, an EWOD chip 120, a circuit board 130, a dielectric film 140, a hydrophobic layer 150, a motor 160, and a plurality of magnets 170.

The bottom substrate 110 includes a hole 111 and a plurality of through holes 112. In some examples, the hole 111 is disposed on a center of the bottom substrate 110. In some examples, the through holes 112 are disposed around the hole 111. In some examples, a number of the through holes 112 are four, each of the through hole 112 is in a shape of rectangular and around the hole 111, and the two adjacent through holes 112 are arranged perpendicular to each other. That is, in the top view, the four through holes 112 is arranged in a square shape. In some examples, a material of the bottom substrate 110 includes acrylic, polycarbonate, acrylic acid derivatives or a combination thereof.

Figure 3:
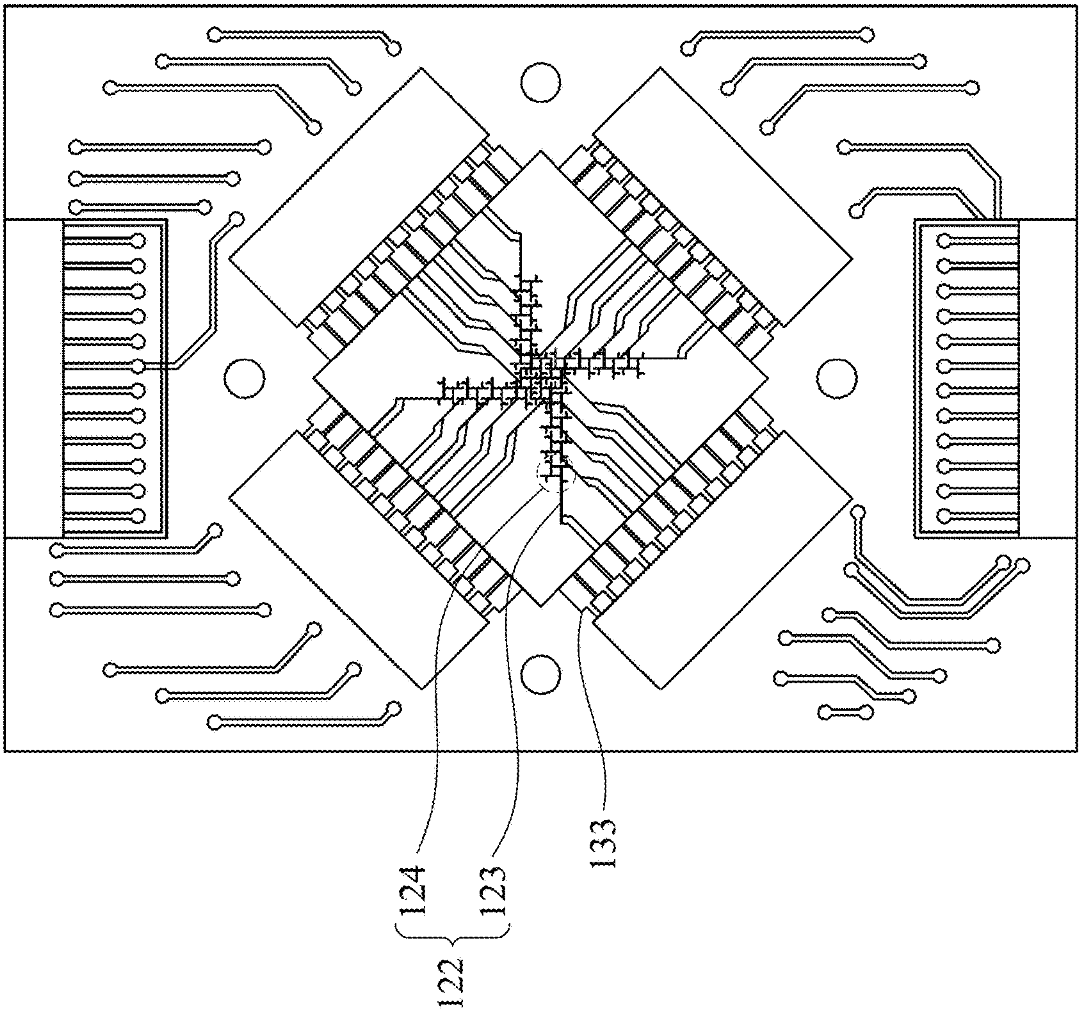
FIG. 3 is a top view of the microfluidic device according to some embodiments of the present disclosure.

Please refer to FIG. 3 at the same time, FIG. 3 is a top view of the microfluidic device according to some embodiments of the present disclosure. The EWOD chip 120 is disposed on the bottom substrate 110, and the EWOD chip 120 includes a paper-based chip. The EWOD chip 120 includes a chip substrate 121 and a conductive layer 122, the conductive layer 122 is disposed on the chip substrate 121. The conductive layer 122 has a plurality of electrode wires 123. An end of each of the electrode wires 123 is an electrode unit 124. In some embodiments, the electrode wires include, but are not limited to indium-tin oxide (ITO), silver (Ag), zinc (Zn), copper (Cu), gold (Au), platinum (Pt), tungsten (W), aluminum (Al), or alloys thereof. In some embodiments, the electrode wires are nano silver, and nano silver dispersions or “inks” can contain additives and binders to control viscosity, corrosion, adhesion and dispersibility. Examples of suitable additives and binders include, but are not limited to carboxymethyl cellulose (CMC), 2-hydroxyethyl cellulose (HEC), hydroxypropyl methyl cellulose (HPMC), methyl cellulose (MC), polyvinyl alcohol (PVA), tripropylene glycol (TPG), and xanthan gum (XG); and surfactants, such as ethoxylates, alkoxylates, ethylene oxide and propylene oxide and copolymers thereof, sulfonates, sulfates, disulfonates, sulfosuccinates, phosphates and fluorinated surfactants (for example, Zonyl® from DuPont).

Figure 4:
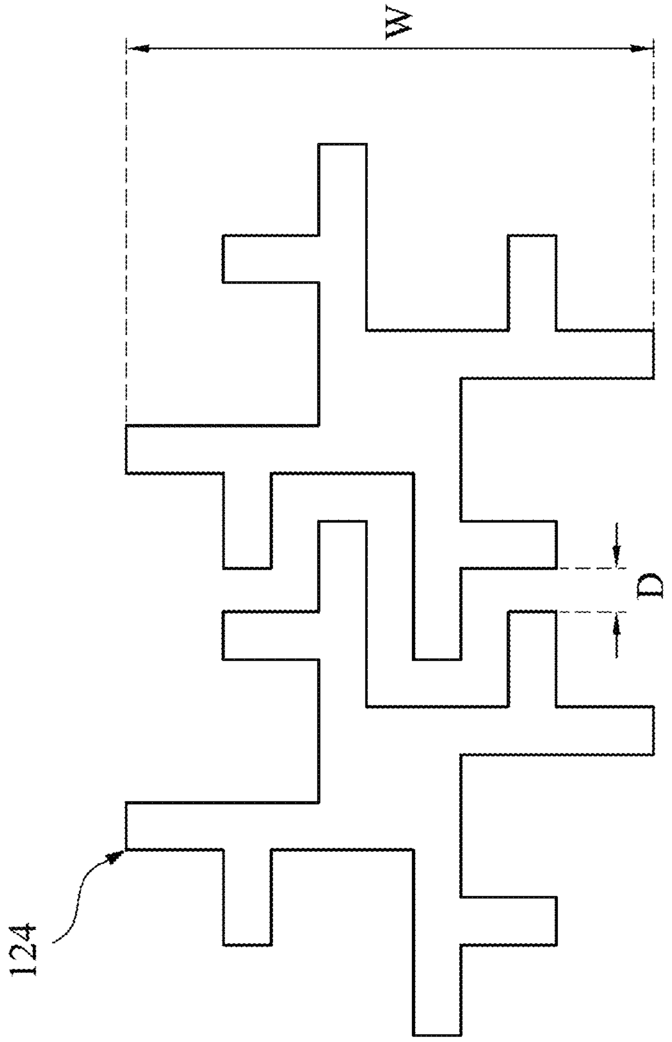
FIG. 4 is a schematic view of an electrode unit according to some embodiments of the present disclosure.

Please refer to FIG. 4, FIG. 4 is a schematic view of an electrode unit according to some embodiments of the present disclosure. In some examples, a pattern of each of the electrode units 124 is in a shape of interdigitated pattern, such as swastika shape. In order to obtain effective actuation of the EWOD chip 120, the smaller the ratio of a gap D between the electrode units 124 to a width of the square-like electrode units 124 is, the better the effective actuation is. This is because when the gap D between two adjacent electrode units 124 is closer, the droplet can be moved under smaller contact angle change, so that the droplet is easier to actuate. In some examples, the gap D is form about 0.1 mm to 1 mm, for example: 0.2 mm, 0.3 mm, 0.4 mm, 0.5 mm, 0.6 mm, 0.7 mm, 0.8 mm, 0.9 mm, or any value between any two of these values, and the ratio of D/W is form about 1% to 20%, for example: 2%, 3%, 4%, 5%, 6%, 7%, 8%, 9%, 10%, 11%, 12%, 13%, 14%, 15%, 16%, 17%, 18%, 19%, or any value between any two of these values.

In some examples, a material of the electrode wires 123 includes nano silver. In some examples, in the paper-based wafer printing process, the chip substrate includes, but is not limited to a glossy label paper, and the nano silver is used as a conductive ink. The electrode pattern was designed by drawing software and was printed with an inkjet printer. After printing, the chip was sintered and baked until the ink was dry, and then a disposable paper-based chip was obtained.

The circuit board 130 is disposed on the EWOD chip 120, the circuit board 130 includes a circuit area 131 and a hollow area 132. The circuit area 131 is electrically connected to the EWOD chip 120. In some examples, the circuit area 131 surrounds the hollow area 132, a portion of the circuit area 131 adjacent to the hollow area 132 has a plurality of pins 133, and the pins 133 are electrically connected to the conductive layer 122 of the EWOD chip 120. The hollow area 132 is adjacent to the circuit area 131, and exposes the EWOD chip 120. The bottom substrate 110 has a hole 111 located corresponding to the hollow area 132.

The dielectric film 140 is disposed on the hollow area 132 of the circuit board 130, and covers the exposed EWOD chip 120. A material of the dielectric film includes, but is not limited to polytetrafluoroethylene, paraffin film, or a combination thereof. In some embodiments, the paraffin film is stretched multiple times to stretch uniformly. In the case of opposite stretching, the film paraffin on the same side must be pulled evenly.

The hydrophobic layer 150 is disposed on the dielectric film 140. A material of the hydrophobic layer includes, but is not limited to silicone oil. In some embodiments, to ensure that the paraffin film and conductive layer 122 can be closely attached, a small amount of the silicone oil (viscosity is 350 cSt; dielectric constant is 2.2 to 2.8) will be used as a medium to wipe on the surface of the conductive layer 122 to increase its adhesion.

Figure 5:
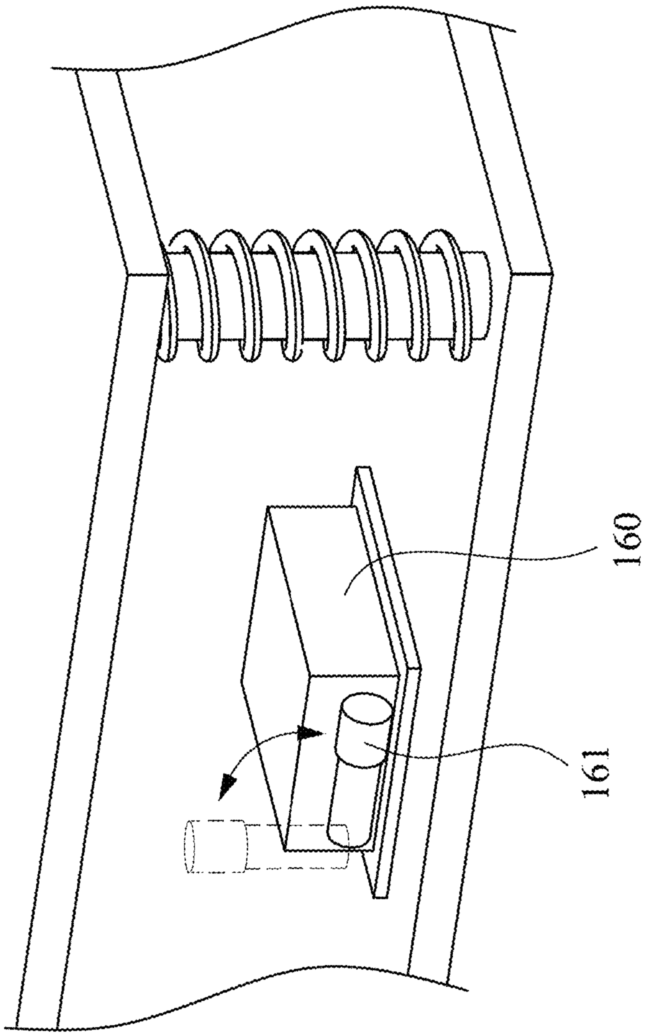
FIG. 5 illustrates an operational view of a motor according to some embodiments of the present disclosure.

Please refer to FIG. 5 at the same time, FIG. 5 illustrates an operational view of a motor according to some embodiments of the present disclosure. The motor 160 is disposed beneath the bottom substrate 110, an end of the motor 160 has a magnetic structure 161, so that the magnetic structure can move closer to or away from the bottom substrate. In some examples, the motor 160 is a servo motor which has a shaft and a bar perpendicular to the shaft, and an end of the bar has a magnetic structure 161. As used herein, “magnetic structure” includes permanent magnet and non-permanent magnet. The permanent magnet refers to the magnet that can maintain its magnetism for a long time, that is, the general magnet used in daily life, such as natural magnets (magnet mines) and artificial magnets (such as aluminum, nickel, cobalt and other alloy elements in iron called Alnico), etc. A non-permanent magnet, such as an electric magnet, is a device that can generate magnetic force by electric current. In some examples, magnetic structure 161 is the effective adsorption of magnetic nanoparticles, for example, cylindrical strong permanent magnet with 6 mm diameter and 6 mm height. In some examples, magnetic structure 161 is electric magnet, for example, cylindrical electric magnet with 6 mm diameter and 6 mm height.

Please refer back to FIG. 2 and FIG. 3, one portion of the magnet 170 is located on the pins 133 of the circuit board 130, the other portion of the magnets 170 is located beneath the EWOD chip 120 and magnetically attracted to some of the magnets located on the pins, so that the pins 133 are closely attached to the conductive layer 122. In some examples, a number of the magnets 170 are eight, four of the magnets 170 are respectively disposed on four areas of the pins 133 of the circuit board 130, and the other four of the magnets 170 are respectively disposed in the four of the through hole 112. In other words, the four of the through holes 112 are respectively corresponding to the four areas of the pins 133, and the upper four of the magnets 170 are respectively corresponding to and magnetically attracted to the lower four of the magnets 170, so that the pins 133 are closely attached to the conductive layer 122.

Figure 6:
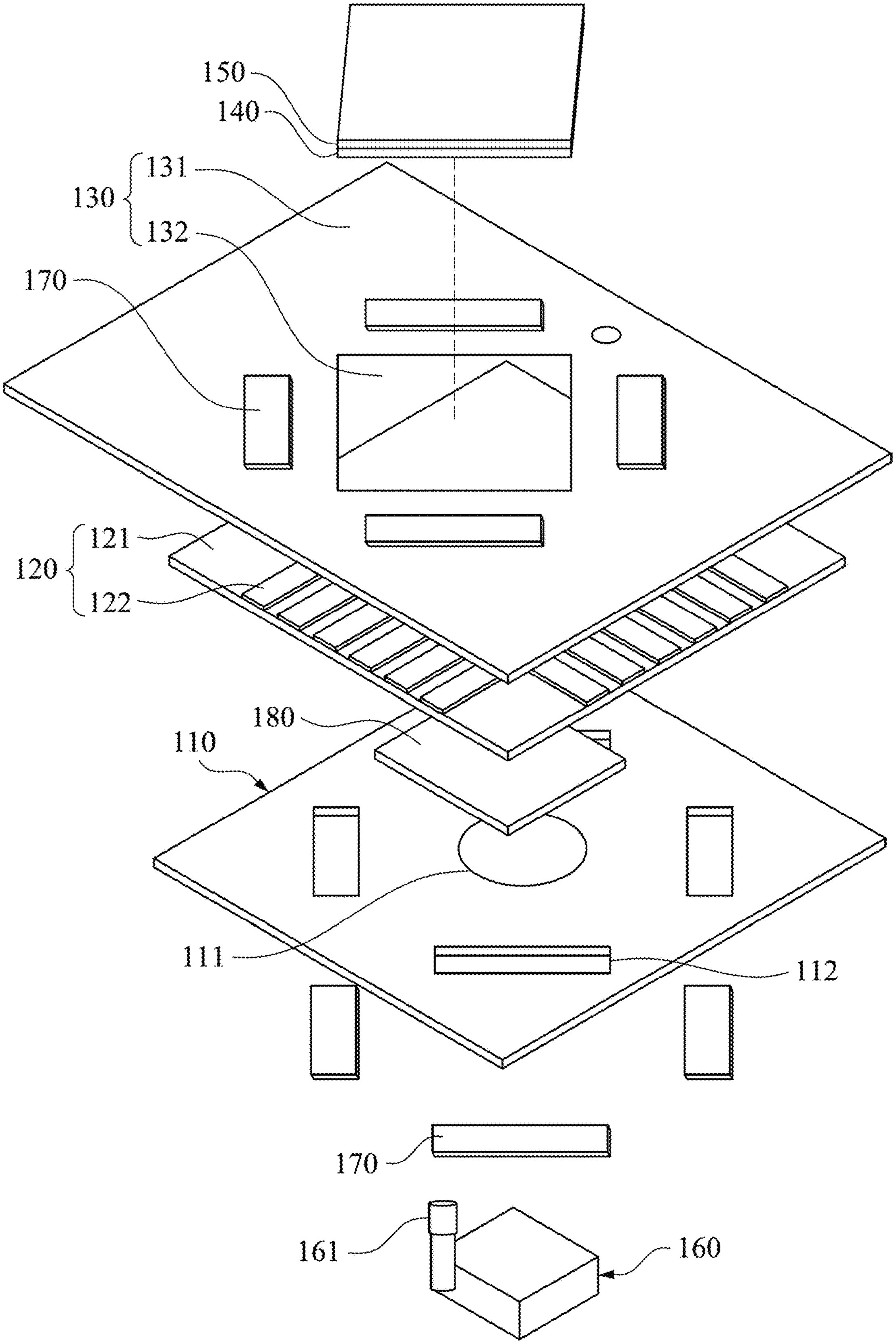
FIG. 6 is an exploded view of the microfluidic device according to other embodiments of the present disclosure.

In other embodiments, please refer to FIG. 6, FIG. 6 is an exploded view of the microfluidic device according to other embodiments of the present disclosure. The microfluidic device 100 further includes a support sheet 180. The support sheet 180 is disposed between the EWOD chip 120 and bottom substrate 110, so as to stabilize and support the structure of the soft EWOD chip 120. In some examples, the support sheet 180 can be selected from hard materials, including but not limited to cover slip.

Although a series of operations or steps are used below to describe the method disclosed herein, an order of these operations or steps should not be construed as a limitation to the present invention. For example, some operations or steps may be performed in a different order and/or other steps may be performed at the same time. In addition, all shown operations, steps and/or features are not required to be executed to implement an embodiment of the present invention. In addition, each operation or step described herein may include a plurality of sub-steps or actions.

Figure 7:
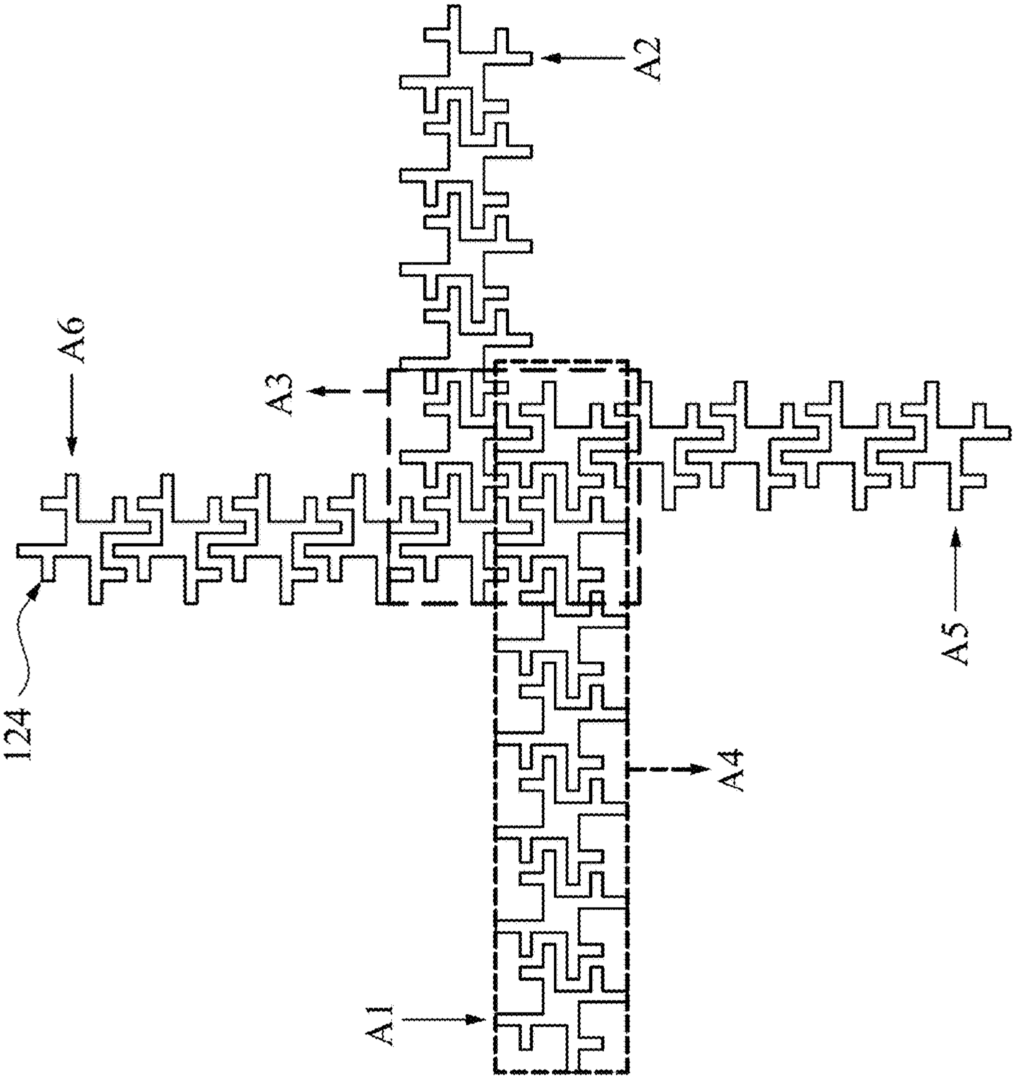
FIG. 7 is a schematic view of electrode wires according to some embodiments of the present disclosure.

The present disclosure also provides a method of using the microfluidic device 100 for detecting sample. Please refer to FIG. 7, FIG. 7 is a schematic view of electrode wires according to some embodiments of the present disclosure. In order to make the platform suitable for the experiment of magnetic nanoparticle-assisted surface-enhanced Raman scattering tag sandwich immunoassay, the electrode unit 124 of the microfluidic device 100 is designed with a cross-shaped electrode pattern that meets the requirement of the experiment. Function of each electrode and moving path are divided into an import area A1 for magnetic nanoparticle (MNP) probe reagent (MNP probe is comprised of one or more MNPs), an import area A2 for sample/wash reagent/nanoaggregate-embedded bead (NAEB) probe 230 reagent (NAEB probe is composed of one or more NAEBs and each NAEB consists of multiple gold nanoparticles and Raman reporter molecules for surface-enhanced Raman scattering), a coalescing area A3 for reagent droplets, a mixing channel A4, a buffer area A5 for collection of MNPs, and a buffer area A6.

Figure 8:
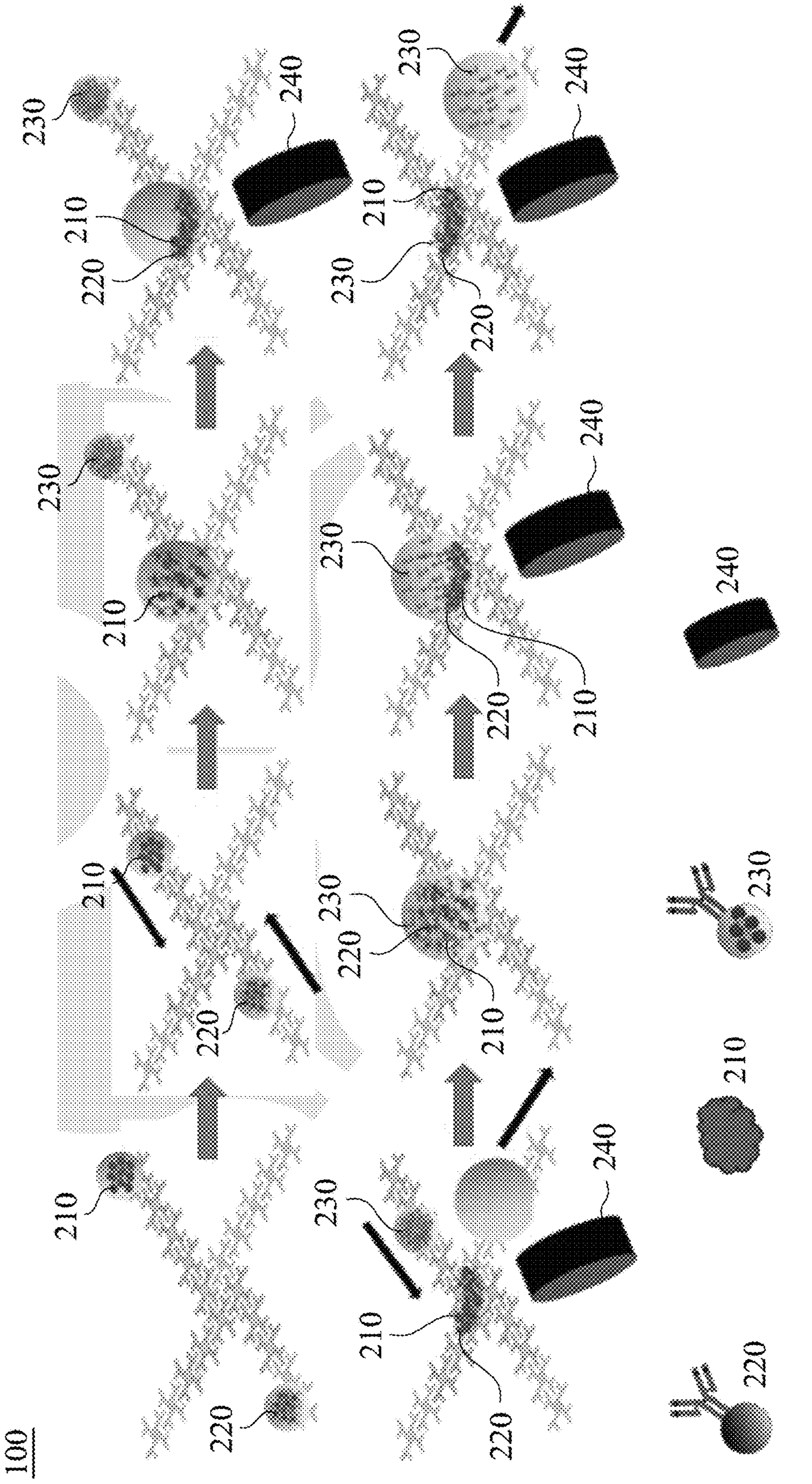
FIG. 8 is a schematic view of showing a detection process of a target under test according to some embodiments of the present disclosure.

Before using the microfluidic device 100, the surface of the paraffin film (EWOD chip 120) was wiped with a thin layer of silicone oil (low viscosity about 5 cSt) to perform a hydrophobic treatment, so that the friction between the droplets and the paraffin film can be reduced. Please refer to FIG. 8, FIG. 8 is a schematic view showing a detection process of a target under test according to some embodiments of the present disclosure. For the detection of a target 210 (such as target protein), automatic process control software was used on microfluidic device 100, and functionalized MNP probe 220 (for example, magnetic nanoparticle surface is modified with a first antibody to identify target) and functionalized NAEB probe 230 (for example, bead surface is modified with a second antibody to identify target) were used for detection.

The droplet of the target 210 under test at the import area A2 and the droplet of the MNP probe 220 at the import area A1 were moved to the coalescing area A3 and merged with each other. The target 210 and MNP probe 220 were fully mixed back and forth at the mixing channel A4 for a period of time, and then were returned to the coalescing area A3 to ensure that the MNP probe 220 specifically bound with the target 210 under test. Next, the magnet 240 (i.e., the same as the magnetic structure 161) was raised to attract and collect the MNP probe 220 bound with the target 210 to form binary complex(es) at the bottom of the droplet, and the supernatant was removed to buffer area A6. Next, a deionized water located at the import area A2 was transferred and redissolved to the binary complex(es) formed by MNP probe 220 bound with target 210 at the coalescing area A3. Next, a droplet of a NAEB probe 230 located at the buffer area A5 was moved into the coalescing area A3 and mixed thoroughly for a period of time to ensure that the NAEB probe 230 can be specifically bound with the target 210 which had been bound with the MNP probe 220, and sandwich complex(es) of the target 210 bound with both the NAEB probe 230 and the MNP probe 220 (NAEB-target-MNP) was formed. Next, the magnet 240 was raised to gather the sandwich complex(es) at the bottom of the droplet, and the unsuccessfully non-bound NAEB probe 230 was transferred to the waste area A6, so that the sandwich complex(es) gathered at the coalescing area A3 can be detected by Raman spectroscopy.

Figure 9:
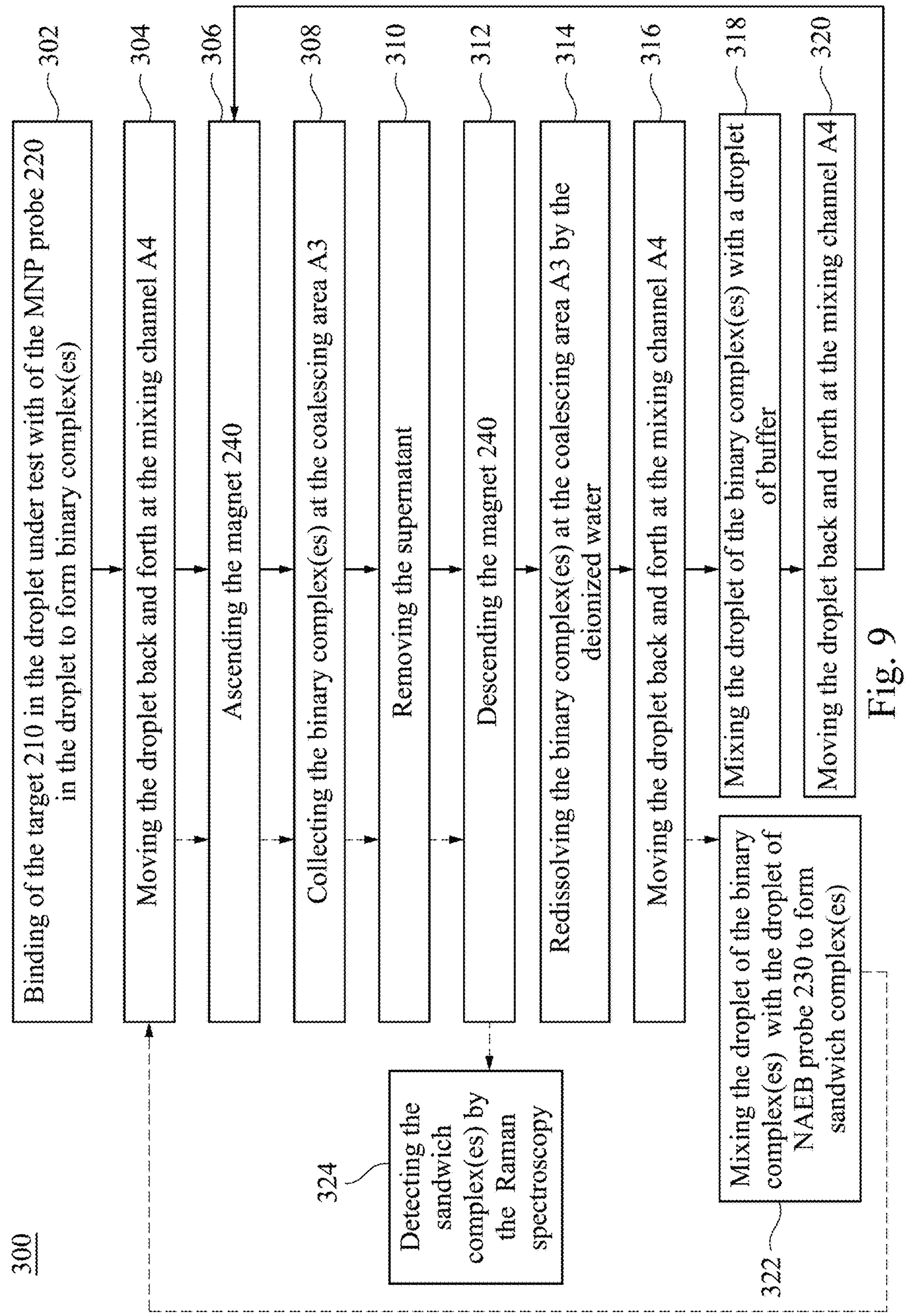
FIG. 9 is a flow chart showing the detection process of the target under test according to some embodiments of the present disclosure.

Please refer to FIG. 9 for the specific process, FIG. 9 is a flow chart showing the detection process of the target under test according to some embodiments of the present disclosure, and a detection process 300 for the target under test is specifically described as follows. Step 302: binding of the target 210 in the droplet under test with of the MNP probe 220 in the droplet to form binary complex(es) through the direction of the solid arrow. Step 304: moving the droplet back and forth at the mixing channel A4, such as 15 times back and forth to mix the complexes. Step 306: ascending the magnet 240. Step 308: collecting the binary complex(es) at the coalescing area A3. Step 310: removing the supernatant. Step 312: descending the magnet 240. Step 314: redissolving the binary complex(es) at the coalescing area A3 by the deionized water. Step 316: moving the droplet back and forth at the mixing channel A4, such as 15 times back and forth to mix the complexes. Step 318: mixing the droplet of the binary complex(es) with a droplet of buffer, such as 2×PBS (phosphate-buffered saline). Step 320: moving the droplet back and forth at the mixing channel A4, such as 15 times back and forth to mix the complex(es). Repeating step 306 to step 316 and then entering the dash line step. Step 322: mixing the droplet of the binary complex(es) with the droplet of NAEB probe 230 to form sandwich complex(es). Repeating step 304 to move the droplet back and forth at the mixing channel A4, such as 15 times back and forth to mix the complexes. Repeating step 306 to step 320 for two times. Repeating step 306 to step 312 to obtain the sandwich complex(es) using magnetic collection and then cleaning up the complexes aggregates. Step 324: detecting the sandwich complex(es) by the Raman spectroscopy.

In some embodiments of the present disclosure, nano silver conductive ink with commercial inkjet printer and photo paper was used to develop a relatively low-cost EWOD chip, and the choice of the dielectric layer and the hydrophobic layer were constructed by using paraffin film and silicone oil (5 cSt). Arduino was used to connect the control circuit and chip carrier made by the printed circuit board layout (PCB layout) to complete the instrument setup, and the driving voltage was only 160 Vrms, which was no different from the performance of electrowetting chips made in the conventional photolithography facility. The EWOD chip of the present disclosure has characteristic of mass production capability and being disposable.

While the disclosure has been described by way of example(s) and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A microfluidic device, comprising:

a bottom substrate, wherein a material of the bottom substrate includes acrylic, polycarbonate, acrylic acid derivatives or a combination thereof;

an electrowetting-on-dielectric (EWOD) chip disposed on the bottom substrate, and the EWOD chip comprising:

a chip substrate; and a conductive layer disposed on the chip substrate, the conductive layer having a plurality of electrode wires, and an end of each one of the electrode wires is an electrode unit; wherein a pattern of each one of the electrode units is in a shape of interdigitated pattern;

a support sheet disposed between the EWOD chip and the bottom substrate, wherein the support sheet is hard material including cover slip;

a circuit board disposed on the EWOD chip, the circuit board comprising:

a circuit area electrically connected to the EWOD chip; and a hollow area adjacent to the circuit area, and exposing the EWOD chip, wherein the bottom substrate has a hole located corresponding to the hollow area;

a dielectric film disposed on the hollow area of the circuit board, and covering the exposed EWOD chip; and a motor disposed beneath the bottom substrate, an end of the motor having a magnetic structure, so that the magnetic structure can move closer to or away from the bottom substrate.

2. The microfluidic device of claim 1, wherein the EWOD chip comprises a paper-based chip.

3. The microfluidic device of claim 1, wherein a material of each of the electrode wires comprises nano silver.

4. The microfluidic device of claim 1, wherein a material of the dielectric film comprises polytetrafluoroethylene, paraffin film, or a combination thereof.

5. The microfluidic device of claim 1, wherein the circuit area surrounds the hollow area.

6. The microfluidic device of claim 1, wherein the circuit area surrounds the hollow area, a portion of the circuit area adjacent to the hollow area has a plurality of pins, and the pins are electrically connected to the conductive layer of the EWOD chip.

7. The microfluidic device of claim 6, further comprising a plurality of magnets, some of the magnets located on the pins, and others of the magnets correspondingly located beneath the EWOD chip and magnetically attracted to some of the magnets located on the pins, so that the pins are closely attached to the conductive layer.

8. The microfluidic device of claim 1, further comprising a hydrophobic layer disposed on the dielectric film.

9. The microfluidic device of claim 8, wherein a material of the hydrophobic layer comprises silicone oil.

10. The microfluidic device of claim 1, wherein the bottom substrate has a hole located corresponding to the hollow area.

11. The microfluidic device of claim 1, wherein the motor is a servo motor.

12. The microfluidic device of claim 1, wherein the interdigitated pattern is swastika shape having a width from a topmost side to a lowermost side of the swastika shape, wherein a gap is between the adjacent two of the electrode units, and a ratio of the gap to the width is form about 1% to 20%.

13. The microfluidic device of claim 12, wherein the gap is from about 0.1 mm to 1 mm.

* * * * *